UNITED STATES PATENT OFFICE.

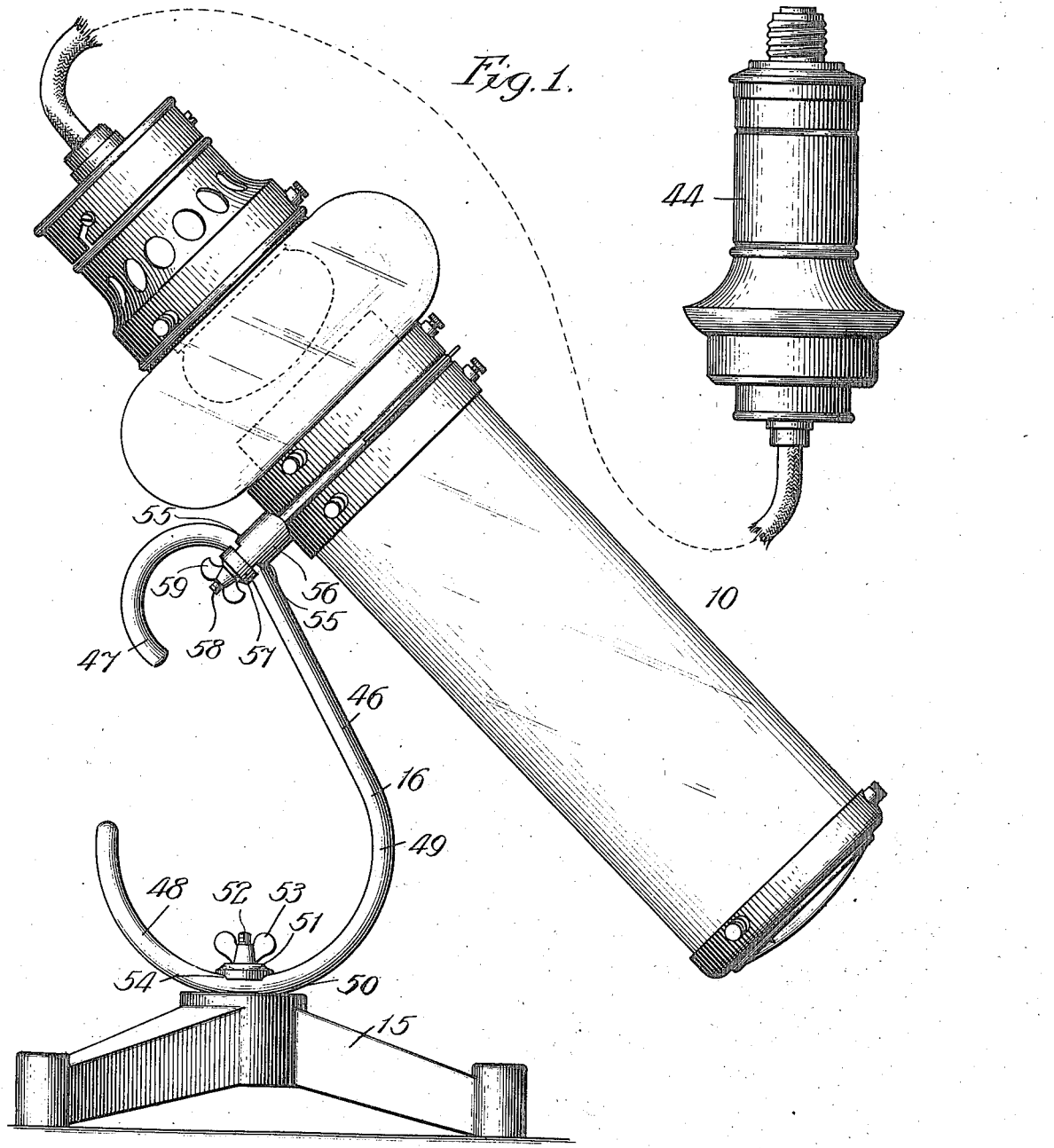

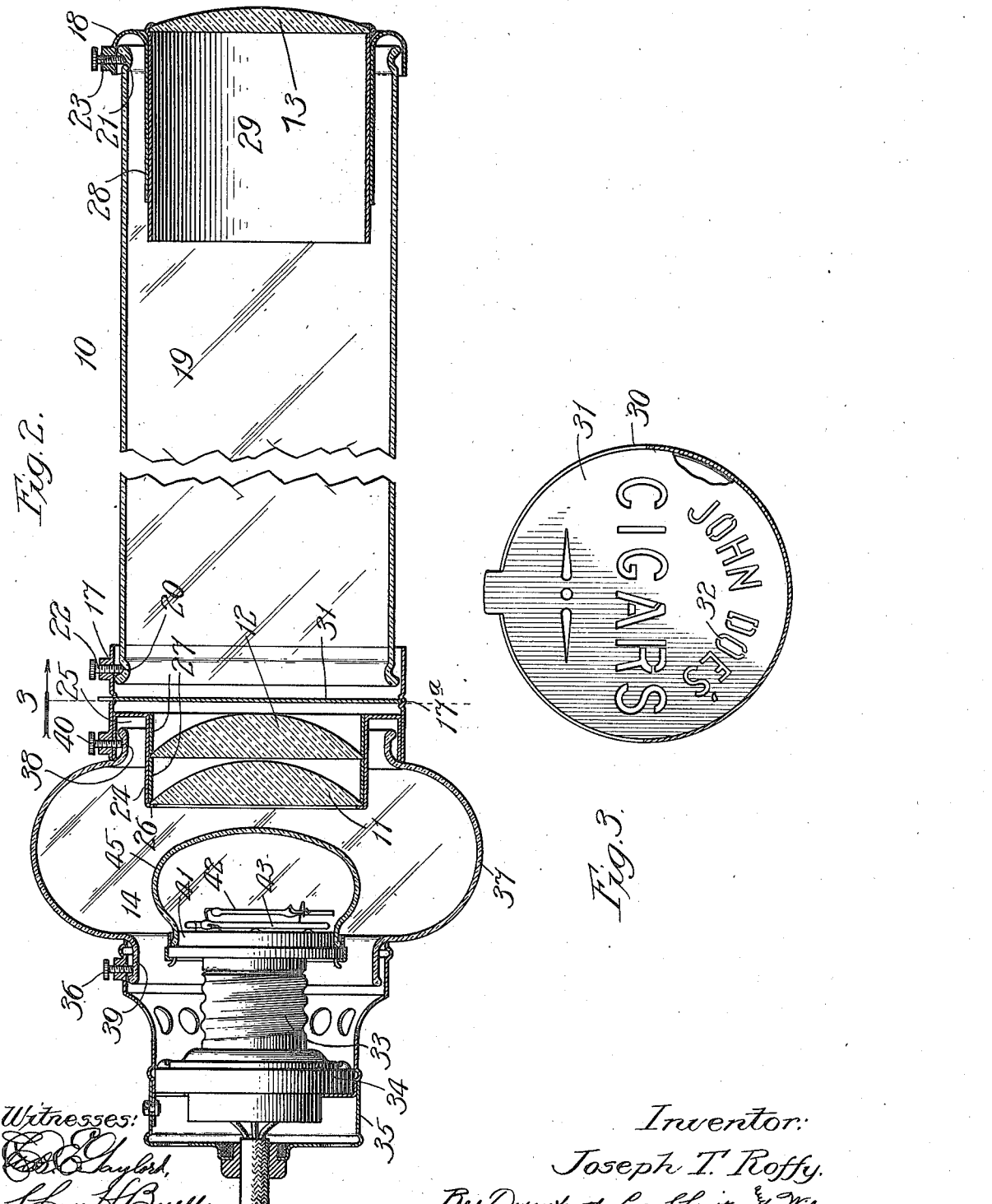

JOSEPH T. ROFFY, OF CHICAGO, ILLINOIS, ASSIGNOR TO NERNST LAMP COMPANY, A CORPORATION OF PENNSYLVANIA.

LAMP.

1,153,445.          Specification of Letters Patent.       Patented Sept. 14, 1915.

Application filed January 14, 1911. Serial No. 602,679.

*To all whom it may concern:*

Be it known that I, JOSEPH T. ROFFY, a subject of the Emperor of Austria-Hungary, residing at Chicago, in the county of Cook and State of Illinois, have invented a new and useful Improvement in Lamps, of which the following is a specification.

My invention relates to an improvement in the class of advertising apparatus involving a system of lenses for throwing upon a suitable display-surface an illuminated area containing the advertisement in magnified form.

I have more especially devised my improvement for projecting the advertisement from a show-case, or other elevated support, in a store upon the floor or sidewalk in front of the store, using as the light medium an electric lamp provided with a translucent globe, whereby the one lamp may be utilized for the double purpose of projecting the advertisement and illuminating the room in which the apparatus is located; and the invention is therefore hereinafter described in that particular connection, though its use is not necessarily limited thereto.

My primary object is to provide a construction of apparatus of the class described which shall be simple of construction and economical of manufacture, and may be readily positioned for use and moved from one position to another as desired with relatively great ease.

Further objects are to provide an apparatus of the character stated which may be readily adjusted as conditions require and in which the light for projecting the advertisement may also serve to light the room, and to improve, generally, upon apparatus of this class as hitherto provided.

Referring to the accompanying drawings—Figure 1 is a view in elevation, partly broken, of an advertisement-displaying apparatus constructed in accordance with my invention. Fig. 2 is an enlarged broken longitudinal sectional view in elevation of the combined, lens-tube and lamp of Fig. 1; and Fig. 3, a section taken at the line 3 on Fig. 2 and viewed in the direction of the arrow.

The apparatus, generally stated, comprises a lens-tube 10 equipped with lenses 11, 12 and 13, arranged to project the advertisement on a plate, hereinafter described, upon a suitable display surface, an electric lamp 14 supported from the tube 10, and a base 15 supporting the tube 10 and lamp 14 through the medium of a connector 16 and at which the apparatus is adapted to be supported, as on the counter of a store.

The lens-tube 10 is preferably formed of two end-sections 17 and 18 of metal with an intermediate section of translucent glass 19. The section 19, which is cylindrical, contains at its opposite ends in its outer surface grooves 20 and 21 into which the inner ends of set-screws 22 and 23 respectively, carried by the sections 17 and 18, extend for holding the sections forming the tube 10 rigidly together. The outer end of the section 17 is formed with a short cylindrical tubular section 24 which is concentric with the section 17 and lies partly within and partly outside of the latter as represented in Fig. 2, thereby affording an annular channel 25 for a purpose hereinafter explained. The outer end of the section 24 is provided with an inturned flange 26 which forms a seat for the lens 11 which preferably is of plano-convex form with its flat side facing outward. The lens 12, which is likewise of plano-convex form with its flat side opposing the convex surface of the lens 11 and its convex surface describing the same arc as the convex surface of the lens 11, fits within the section 24 and is held in place therein and in the proper spaced relation with respect to the lens 11 by spacer rings 27. The section 18 of the tube 10 is formed with a tubular section 28 which extends into the outer end of the section 19 and forms a guide for a focusing-barrel 29 slidably confined therein and carrying in its outer end the lens 13, the latter likewise being of plano-convex form with its curved side facing outward and describing an arc of considerably greater radius than the lenses 11 and 12.

Inserted through a slot 30 in the upper side of the tube-section 17 to extend in front of and closely adjacent to the lens 12 and held in place by seating in an annular groove 17ª in this section, is a removable and replaceable plate 31 which bears the matter to be displayed and coöperates with the lenses and lamp 14 for projecting such matter upon the display-surface. This plate which may be constructed in any suitable manner as is well-known in the art, is shown as formed of opaque material, such as sheet brass, with sections, represented at 32, cut therefrom to conform in outline to the words spelling the advertisement to be displayed and forming a stencil.

The socket for the electric lamp 14 is represented at 33 and is supported on a plate 34 confined in a cylindrical member 35 having one end open and provided with set-screws 36. The member 35 is connected with the tube 10 through the medium of a globe 37 open at both ends and formed of translucent, light-diffusing, glass, the globe 37 being formed at the opposite ends with outwardly-directed flanges 38 and 39 which extend into the channel 25 and the open end of the member 35 and are engaged by the set-screws 36 on the sections 35, and set-screws 40 on the section 17.

The electric lamp 14 which I prefer to employ is of the glower type of the second-class conductors, and as the construction thereof is well-known in the art, a general description only thereof is deemed sufficient. The lamp 14 is formed of a disk-member 41 which is screwed into the socket 33 and is located within the globe 37, this disk being equipped on its outer face, which preferably is arranged in line with the lens 11, with a glower element 42 formed of a material such as to render it a conductor of the second class, viz.: capable of conducting an electric current only when preliminarily heated to a certain degree, and a preliminary heater-coil 43, these parts being constructed and arranged in circuit with a combined ballast and cut-out coil indicated at 44, as is well understood in the art, for supplying current to the coil 43 until the glower 42 has been heated to the predetermined degree, whereupon the circuit through the coil 43 is automatically broken and the current caused to traverse the glower 42 for rendering it incandenscent. If desired, the disk 41 may be provided with a glass globe 45 covering the glower and coil.

The connector 16 is preferably constructed so as to permit the tube 10 and lamp 14 to be adjusted as a unitary structure upon the base 15 to any position desired. In the form illustrated it comprises a pair of parallel rods 46, one only of which is shown, arranged side by side and formed of curved upper and lower sections 47 and 48, respectively, and straight central sections 49. The lower sections 48 of these rods are releasably clamped between the top surface 50 of the base and a clamping-plate 51 fitting over an upwardly-extending threaded stud 52 carried by the base and equipped with a winged nut 53, the rods 46 extending into parallel grooves 54 in the bottom of the plate 51, this feature of the construction permitting of the adjustment of the rods 46 on the base. The upper sections 47 of the rods 46 extend through parallel grooves 55 cut in the bottom surface of a stud 56 carried by the tube-section 17, and are rigidly held in adjusted position thereon by a clamping-plate 57, which fits over a threaded extension 58 on the stud 56, the plate 57 containing parallel grooves (not shown) which oppose the grooves 55 and into which the rod-sections 47 extend when a winged nut 59 on the extension 58 is screwed up tightly against the plate 57, whereby the lens-tube and lamp may be adjusted on the connector 16 to extend at any desired angle.

In the construction illustrated, the light from the lamp 14 passes through the lenses 11, 12 and 13 and plate 31, and by reason of the arrangement of the lenses as represented projects upon the surface against which the light rays passing through the tube 10 are directed, an illuminated sign corresponding to the shape of the sections 32 in the plate 31. The particular arrangement and shapes of lenses illustrated are such as to render them especially adapted for use in connection with a lamp of the character stated, this combination being particularly desirable, as by its use a sign of intense brightness may be projected on a display surface.

By providing for the inclination of the lens-tube 10 and lamp 14 the advertisement may be projected upon the floor by standing the apparatus upon a counter or shelf, and by virtue of the several adjustments provided the angle at which the lens-tube and lamp extend to the vertical plane, may be varied as conditions require for projecting the advertisement upon a display-surface disposed in any position.

It will be noted from the foregoing that the lamp 14 serves a double purpose in the apparatus as I prefer to construct it, viz. it furnishes the light for projecting the advertisement, and by reason of the section 37 aids in lighting the room in which it is located, the rays of light upon striking the glass-section 37 becoming diffused and rendering the entire globe radiant. Forming the section 19 of glass, which, however, as well as the section 37 may be of opaque material if desired, so far as certain of the features of my invention are concerned, aids in utilizing to the maximum extent the light radiated from the lamp.

While I have described the sections 19 and 37 as formed of translucent glass for a purpose stated, I do not wish to be understood as intending to limit my invention to the use of such kind of glass for the purpose stated, as transparent glass, or, in fact, any light-transmitting material, may be employed, where it is desired to provide for the illuminating of the room in which the apparatus is located. Furthermore, so far as the feature of providing a section or sections of light-transmitting material as stated for illuminating the room in which the device is located, is concerned, my invention is not limited to supporting the lens-holder and lamp from a base, as it may be supported in any other suitable manner.

What I claim as new, and desire to secure by Letters Patent, is—

1. A lamp comprising a tube, a lensing system in the tube, a lamp socket having a light source, and an inclosing light emitting globe between the tube and the lamp socket, said globe surrounding the light source.

2. A lamp comprising a lamp socket, a light source carried by the lamp socket, a tube having a lens relatively close to the lamp, and a light emitting globe connecting the tube and lamp socket and surrounding the light source, the lamp socket, lamp and tube having a common axis.

3. In a lamp, a globe having outwardly projecting flanges, a lamp socket connected to one of the flanges of the globe and having a light source extending into the globe, a lensing tube connected to the other flange of the globe and provided with condensing lenses within the globe and in close proximity to the light source, the lamp socket, globe and tube being concentric about a common axis.

JOSEPH T. ROFFY.

In presence of—
A. U. THORIEN,
W. B. DAVIES.